United States Patent
Ariyoshi et al.

(10) Patent No.: US 7,424,728 B2
(45) Date of Patent: Sep. 9, 2008

(54) DOUBLE-SIDED RECORDING/REPRODUCING DISK DRIVE

(75) Inventors: Yuji Ariyoshi, Osaka (JP); Yosuke Noda, Tokyo (JP); Norikatsu Yoshida, Hyogo (JP); Tatsuro Nishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 613 days.

(21) Appl. No.: 10/975,455

(22) Filed: Oct. 29, 2004

(65) Prior Publication Data

US 2005/0097584 A1    May 5, 2005

(30) Foreign Application Priority Data

Oct. 30, 2003  (JP) ............... 2003-369992

(51) Int. Cl.
*G11B 7/08* (2006.01)
(52) U.S. Cl. .................................... 720/668
(58) Field of Classification Search ................ 720/668; 369/199, 200, 195, 264, 266
See application file for complete search history.

(56) References Cited

U.S. PATENT DOCUMENTS 4,811,324 A * 3/1989 Ikedo et al. .............. 369/30.78
4,845,700 A   7/1989 Koizumi et al. ............. 720/615
5,970,029 A   10/1999 Shinada ..................... 369/30.1
5,978,347 A   11/1999 Akama et al. ............... 720/668

FOREIGN PATENT DOCUMENTS

| JP | 2-260242 | 10/1990 |
| JP | 7-320276 A | 12/1995 |
| JP | 9-035316 A | 2/1997 |
| JP | 2000-21069 | 1/2000 |

* cited by examiner

*Primary Examiner*—Julie Anne Watko
(74) *Attorney, Agent, or Firm*—Wenderoth, Lind & Ponack, L.L.P.

(57) ABSTRACT

A disk drive is provided for restraining deterioration of the verticality of the optical axis of an optical pickup in relation to the surface of the disk when the side of the disk to be scanned for the recording and/or reproducing action is alternated from one side to the other side, in recording and/or reproducing data signals on both sides of the disk. The disk drive (1) includes a turn table (11) on which a disk D is rotatably supported, a pickup (12) for recording and/or reproducing data signals on both sides of the disk D rotated by the turn table (11), and a disk tray (31) for transferring the disk D between a recording and reproducing position which confronts the turn table (11) and a loading and unloading position at the outside of the disk drive (1). A turning movement mechanism is provided for turning the turn table (11) and the pickup (12) at once from a first position which confronts the one side of the disk D to a second position which confronts the other side of the disk D or vice versa.

11 Claims, 10 Drawing Sheets

DOUBLE-SIDED RECORDING/REPRODUCING DISK DRIVE

BACKGROUND OF THE INVENTION

1. Field of the Invention

The present invention relates to a disk drive and more specifically to a disk drive capable of writing data signals into a disk and/or reading data signals recorded in the disk on both sides of the disk and a method of controlling the disk drive.

2. Description of the Related Art

Conventionally, so-called double-sided reproducing disk drives capable of writing data signals into a disk and/or reading data signals recorded in the disk (hereinafter, occasionally referred to simply as recording and/or reproducing data signals) on both sides of the disk have been known; for example, one of which is disclosed in Japanese Patent Laid-Open Publication No. 7-320276.

In this prior art disk drive, there is provided a U-shaped guide rail which extends from one side to the other side of the disk, and while a turn table for supporting and rotating a disk remains stationary, an optical pickup travels along the guide rail to record and/or reproduce data signals on both the sides of the disk.

It is essential for recording and/or reproducing the data signals on the disk that the optical axis of the optical pickup is precisely held vertical to the surface of the disk to be scanned (specifically, a disk supporting surface of the turn table). Particularly, in a case of a disk with high recording density such as the so-called DVD disk (digital video disk or digital versatile disk), as the light emitted from the optical pickup is focused to a spot of very small size on a disk and the rotation of the disk is much higher, the accuracy of verticality has to be increased correspondingly.

The prior art double-sided reproducing disk drives allows the optical pickup to move from one side to the other side of the disk for recording and/or reproducing data signals on the other side of the disk when the recording and/or reproducing action on the one side of the disk has been completed, while the turn table remains stationary. Accordingly, the positional relationship between the optical pickup and the turn table is not constant but varies whenever the side of the disk to be scanned for the recording and/or reproducing action is alternated from one side to the other side. It is thus troublesome to maintain the optical axis of the pickup vertical to the surface of the disk to be scanned with a high degree of accuracy.

SUMMARY OF THE INVENTION

The present invention has been developed in view of the foregoing technical drawback and its basic object is to provide a disk drive which can restrain deterioration of verticality of the optical axis of an optical pickup in relation to the surface of the disk when the side of the disk to be scanned for the recording and/or reproducing action is alternated from one side to the other side, in recording and/or reproducing data signals on both sides of the disk.

In order to achieve the above-mentioned object, according to a first aspect of the present invention, there is provided a disk drive including a turn table for rotatably supporting a disk thereon, a pickup for recording and/or reproducing data signals on the disk rotated on the turn table, and a disk transfer mechanism for transferring the disk forward and backward between a recording/reproducing (recording and reproducing) position which confronts the turn table and a disk loading/unloading (disk loading and unloading) position at the outside of the disk drive, wherein a turning movement mechanism for turning the turn table and the pickup at once from a first position which confronts one side of the disk to a second position which confronts the other side of the disk or vice versa.

In this construction, since the turn table and the pickup are rotatably moved at once between the first position and the second position, their positional relationship between them securely remains unchanged when the side of the disk to be scanned for the recording and/or reproducing action is alternated from one side to the other side.

In an embodiment of the invention, preferably a standby position for holding the disk at the standby mode is provided between the recording/reproducing position and the loading/unloading position, and the three positions are aligned in a row along the direction of transfer movement of the disk as ordered from the recording/reproducing position to the standby position and the loading/unloading position.

Accordingly, in turning the turn table and the pickup after the disk is scanned at one side for the recording and/or reproducing action, the disk is moved from the recording/reproducing position to the standby position, which is located on the way to the loading/unloading position, and it is not required to pull out the disk to the loading/unloading position. And, the turn table and the pickup are turned in a state in which the disk is held in standby mode at the standby position. Also, the recording/reproducing position, the standby position, and the loading/unloading position are aligned a row along the direction of transfer movement of the disk. This allows the disk drive to remain not increased in width (at a right angle to the direction of transfer movement of the disk) regardless of the provision of the standby position.

Further, in an embodiment of the invention, preferably the standby position is located in the disk drive. Accordingly, the disk at the standby mode can stay inside the disk drive.

Furthermore, in an embodiment of the invention, the disk drive preferably further includes a component base on which at least the turn table and the pickup are mounted. The component base is supported by a main case of the disk drive for turning about the center line, which extends through the center of the turn table and the center of the pickup. The turning movement mechanism is arranged to turn the component base about the center line so that the turn table and the pickup can be turned at once between the first position and the second position.

In this case, the turn table and the pickup can be moved easily and securely by turning the component base. In particular, the component base turns about the center line, which extends across the center of the turn table and the center of the pickup. And hence, no change is permitted in the positional relationship between the turn table, the pickup, and the center line.

Furthermore, in an embodiment of the invention, preferably the center line is extended in the same direction as that of the transfer movement of the disk.

Accordingly, when the component base is turned to move the turn table and the pickup, the position of the turn table, the pickup, and the center line in relation to the direction of transfer movement of the disk can remain unchanged.

Furthermore, in an embodiment of the invention, the disk drive may further include a component base displacing mechanism for displacing the component base along the axis of rotation of the turn table.

Accordingly, the component base can be turned while having been or being displaced along the axis of rotation of the turn table (in a direction perpendicular to the disk supporting surface of the turn table).

Furthermore, in an embodiment of the invention, preferably the component base displacing mechanism is located at the outside of the path of the transfer movement of the disk.

Accordingly, the disk, when being transferred, can successfully avoid being directly interrupted by the component base displacing mechanism.

Furthermore, in an embodiment of the invention, it is preferable that the intermediate chassis supported by the main case is disposed between the main case and the component base while the turning movement mechanism is arranged for turning the component base in relation to the intermediate chassis.

Accordingly, as the turning movement mechanism turns the component base in relation to the intermediate chassis, the turning movement mechanism is arranged so as to associate the intermediate chassis and the component base with each other.

Furthermore, in an embodiment of the invention, preferably the component base displacing mechanism is arranged for displacing the component base via the intermediate chassis. In this case, the component base displacing mechanism is arranged to associate the main case and the intermediate chassis with each other.

Furthermore, in an embodiment of the invention, it is preferable that the intermediate chassis is supported at both sides by the main case at the outside of the path of the transfer movement of the disk.

Accordingly, the disk, when being transferred, can successfully avoid being directly interrupted by a supporting mechanism of the intermediate chassis. In turn, the intermediate chassis (and the component base) can stably be supported by the main case.

Furthermore, in an embodiment of the invention, it is preferable that the disk is of a cartridge type and the intermediate chassis includes a positioning means for positioning the disk via its cartridge.

Accordingly, the positioning of the disk in relation to the component base (or the turn table) can be conducted easily and securely with the help of the intermediate chassis.

Furthermore, in an embodiment of the invention, it is preferable that the intermediate chassis has two sides, a first side confronting the first position and a second side confronting the second position, and the two positioning means are mounted on the two, first and second, sides of the intermediate chassis, respectively.

Accordingly, the positioning of the disk in relation to the component base (or the turn table) can be conducted easily and securely with the help of the intermediate chassis regardless of the turn table and the pickup located at either the first or second position.

Furthermore, in an embodiment of the invention, it is preferable that the disk drive further includes a clamping mechanism for pressing down the disk on and against the turn table, and the clamping mechanism is arranged for being turned together with the turn table and the pickup.

Accordingly, the positional relationship between the turn table and the pickup can be maintained constant even when the side of the disk to be scanned for the recording and/or reproducing action is alternated from one side to the other side, while the position of the turn table in relation to the clamping mechanism remains unchanged.

According to a second aspect of the present invention, there is provided a method of controlling a disk drive which has a turn table for rotatably supporting a disk thereon, a pickup for recording and/or reproducing data signals on the disk rotated on the turn table, and a disk transfer mechanism for transferring the disk forward and backward between a recording/reproducing position which confronts the turn table and a disk loading/unloading position at the outside of the disk drive. Particularly, the method includes (a) a first transfer step of transferring the disk from the loading/unloading position to the recording/reproducing position, (b) a first recording and/or reproducing step of recording and/or reproducing data signals on one side of the disk with the turn table and the pickup located at a first position which confronts the one side of the disk, (c) a second transfer step of transferring the disk, after the first recording and/or reproducing step, to a disk standby position which is provided between the recording/reproducing position and the loading/unloading position, (d) a turning movement step of turnably moving the turn table and the pickup at once from the first position to the second position which confronts the other side of the disk, (e) a third transfer step of transferring the disk, after the turning movement step, from the disk standby position to the recording/reproducing position, (f) a second recording and/or reproducing step of recording and/or reproducing data signals on the other side of the disk with the turn table and the pickup located at the second position, and (g) a fourth transfer step of transferring the disk, after the second recording and/or reproducing step, from the recording/reproducing position via the disk standby position to the loading/unloading position.

In this case, since the turn table and the pickup are rotatably moved at once between the first position and the second position, their positional relationship between them securely remains unchanged when the side of the disk to be scanned for the recording and/or reproducing action is alternated from one side to the other side.

Further, according to a third aspect of the present invention, there is provided a method of controlling a disk drive which has a turn table for rotatably supporting a disk thereon, a pickup for recording and/or reproducing data signals on the disk rotated on the turn table, and a disk transfer mechanism for transferring the disk forward and backward between a recording and reproducing position which confronts the turn table and a disk loading and unloading position at the outside of the disk drive. In particular, for shifting the turn table and the pickup from a first position which confronts one side of the disk to a second position which confronts the other side of the disk, the steps are carried out in a sequence of (a) a first transfer step of transferring the disk to a disk standby position which is provided between the recording/reproducing position and the loading/unloading position, (b) a turning movement step of turnably moving the turn table and the pickup at once from the first position to the second position, and (c) a second transfer step of transferring the disk from the disk standby position to the recording/reproducing position.

In this case, in shifting the turn table and the pickup from the first position to the second position, since the turn table and the pickup are rotatably moved at once between the first position and the second position, their positional relationship between them securely remains unchanged when the side of the disk to be scanned for the recording and/or reproducing action is alternated from one side to the other side.

As an advantage of the first aspect of the present invention, after one side of the disk has been scanned for the recording and/or reproducing action, when the other side of the disk is to be scanned for the recording and/or reproducing action, the turn table and the pickup can be turned at once, from the first position which confronts the one side of the disk to the second position which confronts the other side of the disk by the action of the turning movement mechanism. This allows the positional relationship between the turn table and the pickup to remain securely unchanged when the side of the disk to be scanned for the recording and/or reproducing action is alternated from one side to the other side. Accordingly, the verticality of the optical axis of the pickup in relation to the surface of the disk can be maintained with a high degree of accuracy even when the side of the disk to be scanned for the recording and/or reproducing action is alternated from one side to the other side.

According to an embodiment of the invention, preferably, the standby position for the disk is provided between the recording/reproducing position and the loading/unloading position for holding the disk at the standby mode. Therefore, in turning the turn table and the pickup after the disk has been scanned at one side for the recording and/or reproducing action, the disk is moved from the recording/reproducing position to the standby position which is located on the way to the loading/unloading position, and it is not required to pull out the disk to the loading/unloading position. And, the turn table and the pickup are turned in a state in which the disk is held in standby mode at the standby position. Thereby, the disk is transferred without being pulled out to the loading/unloading position at the outside of the disk drive, and the disk can successfully avoid being interrupted by the turning movement of the turn table and the pickup with ease and certainty. Moreover, the recording/reproducing position, the standby position, and the loading/unloading position are aligned a row along the direction of transfer movement of the disk. This allows the disk drive to remain the same width (at a right angle to the direction of transfer movement of the disk) regardless of the provision of the standby position.

Further, according to an embodiment of the invention, the standby station is preferably defined in the disk drive, thereby the disk at the standby station remains in the interior of the disk drive and is never exposed to the outside. Accordingly, protection of the disk at the standby position is improved, while the external appearance of the disk drive remains undisturbed.

Furthermore, according to an embodiment of the invention, the component base is preferably provided and supported by the main case for carrying at least the turn table and the pickup thereon. When the component base is turned by the action of the turning movement mechanism, the turn table and the pickup can be moved easily and readily between the first position and the second position. Moreover, since the component base is turned about the center line which extends across the center of the turn table and the center of the pickup, the positional relationship between the turn table, the pickup, and the center line can remain unchanged.

Furthermore, according to an embodiment of the invention, the center line about which the component base is turned preferably extends in the same direction as of the transfer movement of the disk. Therefore, during the turning movement of the component base together with the turn table and the pickup, the position of the turn table and the pickup along the center line in relation to the direction of the transfer movement of the disk can remain unchanged.

Furthermore, according to an embodiment of the invention, more preferably, the component base displacing mechanism is further provided for displacing the component base along the axis of rotation of the turn table. The component base can be turned while having been or being displaced along the axis of rotation of the turn table (in a direction perpendicular to the disk supporting surface of the turn table).

Furthermore, according to an embodiment of the invention, more preferably, the component base displacing mechanism is located at the outside of the path of the transfer movement of the disk. Thereby, the disk when being transferred can successfully be avoided from being directly interrupted by the component base displacing mechanism.

Furthermore, according to an embodiment of the invention, more preferably, the intermediate chassis is disposed between the main case and the component base as supported by the main case. As the turning movement mechanism turns the component base in relation to the intermediate chassis, it may be arranged to associate the intermediate chassis and the component base with each other. This allows the intermediate chassis, the component base, and the turning movement mechanism to be assembled in a single unit, thus improving both the assembling efficiency and the handling capability of the disk drive.

Furthermore, according to an embodiment of the invention, more preferably, the component base displacing mechanism is arranged for displacing the component base via the intermediate chassis. This allows the component base to carry out simultaneously the turning movement and the displacement along the axis of rotation of the turn table via the intermediate chassis. Thereby, in arranging both the turning movement mechanism and the component base displacing mechanism, it is possible to simplify the construction and save space. Also, as the component base displacing mechanism may be arranged to associate the main case and the intermediate chassis with each other. Therefore, the intermediate chassis, the component base, and the turning movement mechanism can be assembled as a single unit. Then, the intermediate chassis can be mounted by the component base displacing mechanism to the main case, thereby improving the efficiency of the assembly process.

Furthermore, according to an embodiment of the invention, more preferably, the intermediate chassis is supported at both sides by the main case at the outside of the path of the transfer movement of the disk in the main case. This allows the disk, when being transferred, to successfully avoid being directly interrupted by a supporting mechanism of the intermediate chassis. In turn, the intermediate chassis (and the component base) can stably be supported by the main case.

Furthermore, according to an embodiment of the invention, more preferably, while the disk is of a cartridge type, the intermediate chassis includes the positioning means for positioning the disk via its cartridge. Therefore, the positioning of the disk in relation to the component base (or the turn table) can be conducted easily and securely with the help of the intermediate chassis with no use of a specific positioning mechanism.

Furthermore, according to an embodiment of the invention, more preferably, the intermediate chassis is provided with the first side confronting the first position and the second side confronting the second position. And, as the two positioning means are mounted on the two, first and second, sides of the intermediate chassis, respectively, the positioning of the disk in relation to the component base (or the turn table) can be conducted easily and securely with the help of the intermediate chassis but not any specific positioning mechanism regardless of the turn table and the pickup located at either the first or second position.

Furthermore, according to an embodiment of the invention, more preferably, the clamping mechanism, for pressing the disk on and against the turn table, is arranged to be turned together with the turn table and the pickup. Therefore, the clamping mechanism is arranged to be singly operable on both sides of the disk, and thus a clamping mechanism is not needed for each side of the disk.

Moreover, the positional relationship between the turn table and the pickup can be maintained constant even when the side of the disk to be scanned for the recording and/or reproducing action is alternated from one side to the other side, while the position of the turn table in relation to the clamping mechanism remains unchanged. As the disk is pressed against the turn table by the clamping mechanism, its surface can be accurately held in an orthogonal position relative to the optical axis of the pickup. More specifically, the verticality of the optical axis of the pickup in relation to the surface of the disk can remain unchanged when the side of the disk to be scanned for the recording and/or reproducing action is alternated from one side to the other side.

As an advantage of the method of controlling the disk drive according to the second aspect of the present invention, after one side of the disk has been scanned for the recording and/or reproducing action, when the other side of the disk is to be scanned for the recording and/or reproducing action, the turn table and the pickup are turned at once, from the first position which confronts the one side of the disk to the second position which confronts the other side of the disk. This allows the positional relationship between the turn table and the pickup to remain securely unchanged when the side of the disk to be scanned for the recording and/or reproducing action is alternated from one side to the other side. Accordingly, the verticality of the optical axis of the pickup in relation to the surface of the disk can be accurately maintained even when the side of the disk to be scanned for the recording and/or reproducing action is alternated from one side to the other side.

Also, as an advantage of the method of controlling the disk drive according to the third aspect of the present invention, the turn table and the pickup are turned at once when they are turned from the first position which confronts one side of the disk to the second position which confronts the other side of the disk. The positional relationship between the turn table and the pickup can hence remain unchanged when the side of the disk to be scanned for the recording and/or reproducing action is alternated from one side to the other side. Accordingly, the verticality of the optical axis of the pickup in relation to the surface of the disk can be accurately maintained even when the side of the disk to be scanned for the recording and/or reproducing action is alternated from one side to the other side.

DESCRIPTION OF THE PREFERRED EMBODIMENTS

Figure 1:
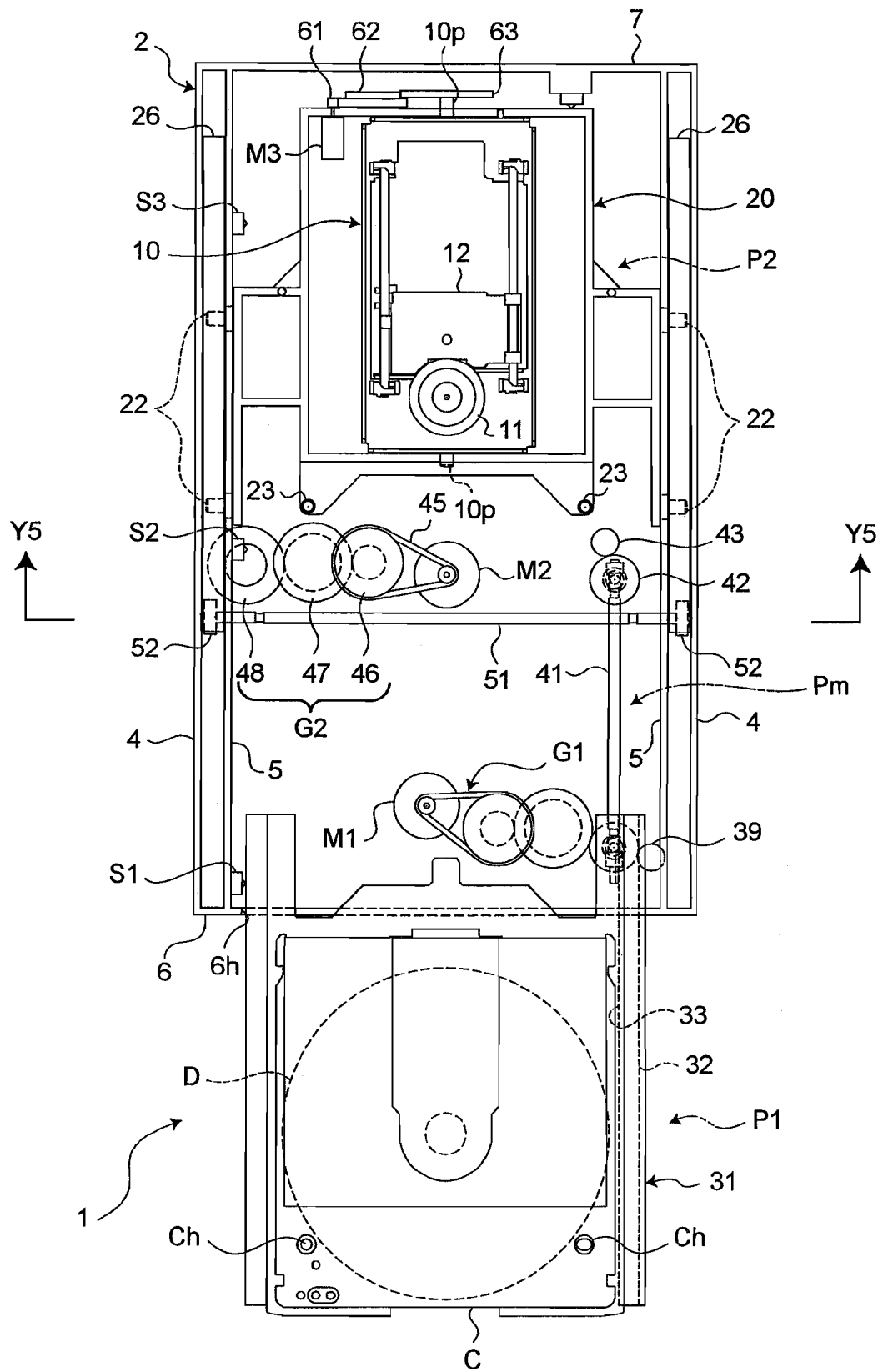
FIG. 1 is an explanatory plan view of an interior arrangement of an optical disk drive according to an embodiment of the present invention, where the disk tray is at a disk loading/unloading position outside of the disk drive.
Figure 2:
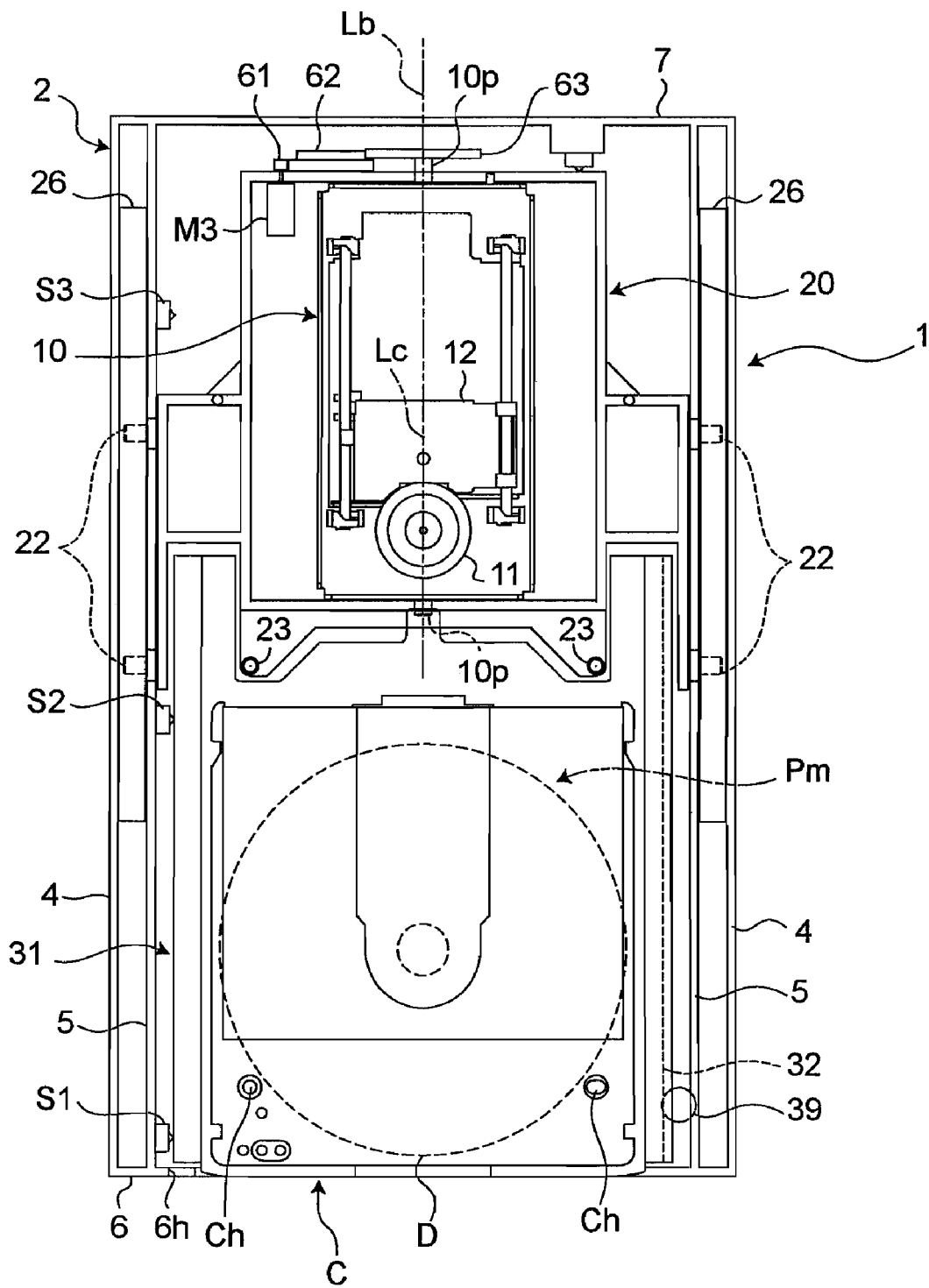
FIG. 2 is an explanatory plan view of the interior arrangement of the optical disk drive, where the disk tray is at a standby position.
Figure 3:
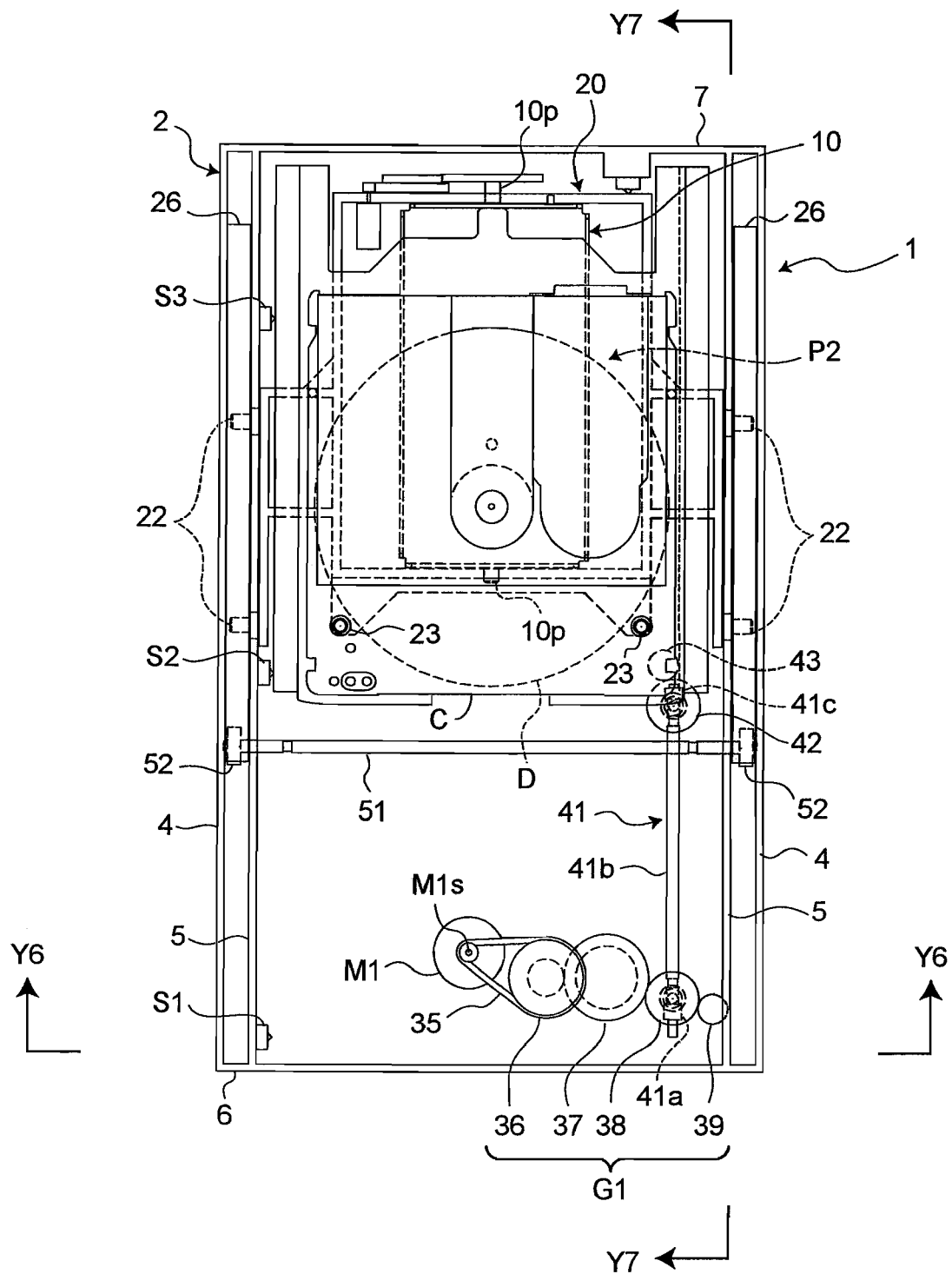
FIG. 3 is an explanatory plan view of the interior arrangement of the optical disk drive, where the disk tray is at a recording/reproducing position.
Figure 4:
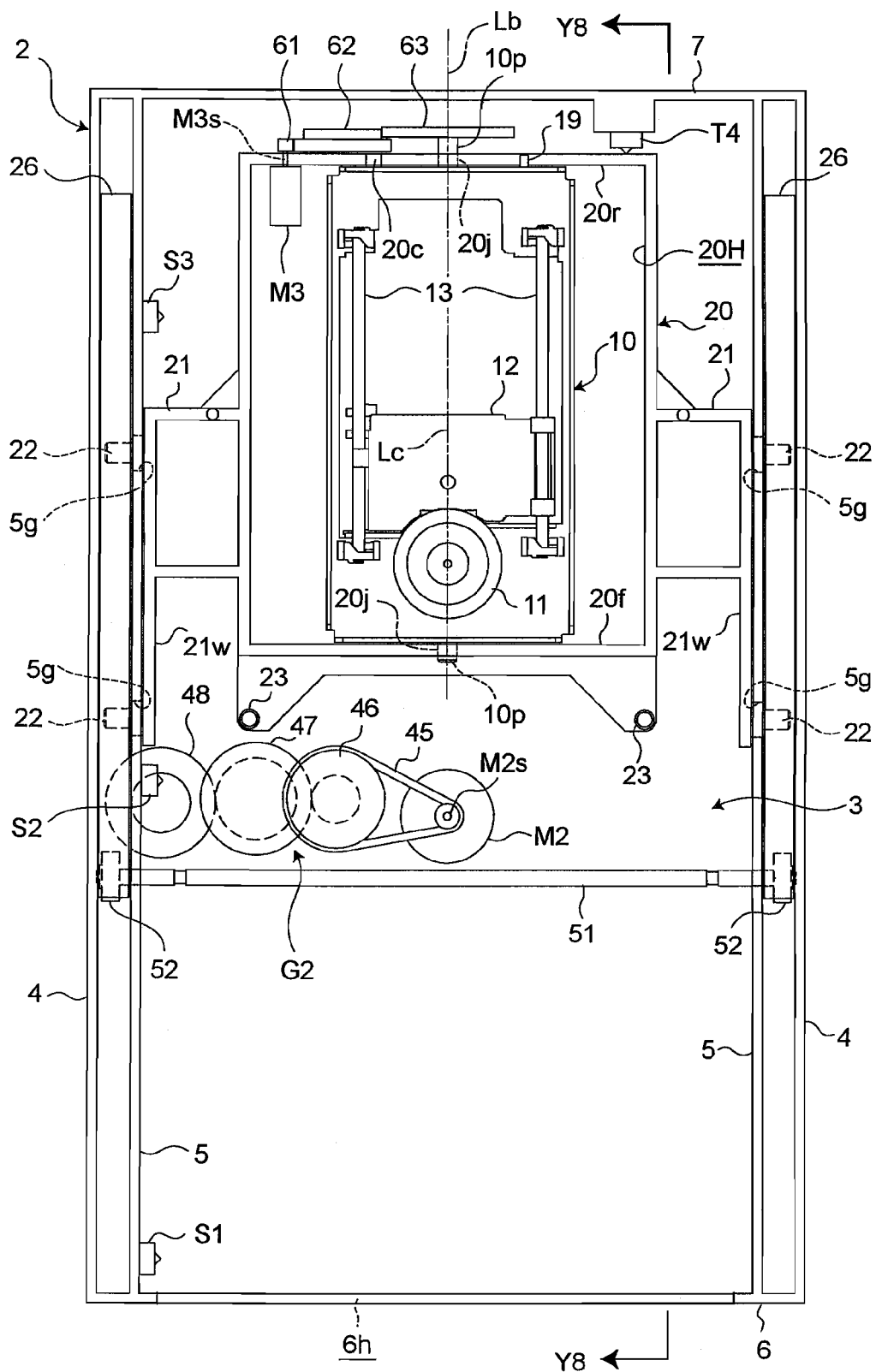
FIG. 4 is an enlarged explanatory plan view of a primary part of the interior arrangement of the optical disk drive.

Preferred embodiments of the present invention will be described in more detail with reference to the accompanying drawings. FIGS. 1 to 3 are explanatory plan views of the internal construction of an optical disk drive (hereinafter, occasionally, referred to simply as an apparatus) according to one embodiment of the present invention. More specifically, FIG. 1 illustrates the interior arrangement of the disk drive with its disk tray moved out to a disk loading position. FIG. 2 illustrates the interior arrangement of the disk drive with the disk tray stored at a standby position. FIG. 3 illustrates the interior arrangement of the disk drive with the disk tray held at a recording/reproducing position. FIG. 4 is an enlarged explanatory plan view showing a primary part of the internal construction of the disk drive, and the disk tray and its drive mechanism are omitted therein. Throughout the plan views of FIGS. 1 to 4, the disk drive is illustrated with its top plate eliminated for ease of viewing its internal construction.

It is to be noted in the description of the embodiments that the front side of the disk drive 1 is where a disk D (or a tray 31) is pulled out of the apparatus 1 and the rear side (or the back side) is where the disk D is stored. It is also to be noted that the frontward and rearward directions of the apparatus 1 extend at right angles to the leftward and rightward directions or widthwise directions in the plan views (of FIGS. 1 to 4). Moreover, it is to be noted that the upward and downward directions extend at right angles to the forward and backward directions and the widthwise directions of the apparatus 1 (and also at a right angle to the plane of the paper sheets in FIGS. 1 to 4).

The apparatus (disk drive) of this embodiment is used in its horizontal state and is known as of a horizontal type disk drive. The present invention is not limited to the horizontal type of the disk drive but is also applicable to a so-called vertical type which is used in its vertical state. In the latter case, either the leftward and rightward directions or the widthwise directions may be replaced by the upward and downward directions.

The disk D employed in this embodiment is, for example, a digital versatile disk (so-called DVD), and data signals can be recorded and/or reproduced on both sides thereof. The disk D is also of the so-called cartridge type as accommodated in a cartridge C made of plastic.

The disk drive 1 of this embodiment is hence a double-sided recording/reproducing disk drive for automatically recording and/or reproducing data signals on both sides of a disk D on both sides of which the data signal can be recorded and/or reproduced. It is not necessary for any user to pull out the tray and manually place the disk D up-side down on the tray at the loading/unloading position when the disk D has been scanned on one side thereof for recording and/or reproducing the data signal.

As shown in FIGS. 1 to 4, the disk drive 1 includes a box-like main case 2 having a substantially rectangular shape in plan view and arranged to serve as the base of the apparatus (disk drive) in which primary components can be accommodated. The main case 2 has a bottom side (apparatus base) 3 thereof provided as the base level of the apparatus. A pair of side walls 4 is provided upright on both left and right ends of the apparatus base 3. Also, a front wall 6 and a rear wall 7 are provided upright on the front and rear ends of the base 3, respectively. The front wall 6 has an opening 6h provided therein across which the disk tray 31 is moved in and out. The main case 2 is preferably made of a metal plate such as a steel plate. Alternatively, the main case 2 may be made of a synthetic resin.

In the embodiment, a traverse base 10 supported by the main case 2 is provided separately from the apparatus base 3, which serves as the base of the main case 2. At least a turn table 11 and an optical pickup 12 are mounted on the traverse base 10. The traverse base 10 is expressed as a component base in the claims of this application.

As is well known, the turn table 11 is designed for rotatably supporting the disk D thereon. The optical pickup 12 scans the disk D, which is rotated by the turn table 11 for recording and/or reproducing data signals on the disk D.

In addition to the turn table 11 and the optical pickup 12, the traverse base 10 carries a pair of guide rods 13 for guiding the movement of the optical pickup 12, an electric motor (not shown) for driving the optical pickup 12, and a spindle motor (not shown) for driving the turn table 11.

A circuit board (not shown) is also mounted on the apparatus base 3 for receiving detection or other output signals from various sensors and switches. In addition, a control circuit is provided for controlling the action of the motors in response to the corresponding signals.

An intermediate chassis 20 having a frame portion of a substantially rectangular frame shape in plan view is provided at the outer side of the traverse base 10 (see FIG. 4). The intermediate chassis 20 has a pair of outward extensions 21 provided integrally on both the left and right ends thereof. Each of the extensions 21 has an end wall 21w provided integrally on the outer end thereof and arranged to extend a predetermined length along the forward and backward directions of the main case 2. A pair of outwardly extending pins (support pins) 22 are provided integrally close to both, front and rear, ends of the end wall 21w.

The intermediate chassis 20 and the traverse base 10 are preferably fabricated with a synthetic resin material.

A couple of inner walls 5 are provided at the inner side of the left and right side walls 4 respectively of the main case 2, and the inner walls are spaced at a distance from the side walls 4. A slider plate 26 is provided between the inner wall 5 and the side wall 4 at either side for sliding in the frontward and rearward directions. Each of the two slider plates 26 at both left and right sides has a pair of front and rear guide slots K (see FIG. 8) provided therein as will be explained later in more detail. As not explicitly illustrated, a guide strip is mounted on the inner surface of each side wall 4 for guiding the forward and backward sliding movement of the slider plate 26. The guide strip may be mounted on the inner wall 5 at either side.

The inner wall 5, at each side, has a pair of front and rear vertical slots 5g provided therein (See FIG. 4). As will be explained later in more detail, the support pins 22 provided on the end walls 21w of the intermediate chassis 20 extend across the slots 5g of the inner walls 5 and engage with the corresponding guide slots K in the slider plates 26. This allows the intermediate chassis 20 to be supported via the left and right slider plates 26 by the main case 2.

The traverse base 10 has two, front and rear, projections 10p provided on the front and rear sides thereof so as to extend outwardly from the center along the widthwise direction (the leftward and rightward directions). In particular, the two projections 10p are aligned with each other along a center axis Lb thus to determine the location and the direction of projection. More particularly, the axis Lb of the two projections 10p extends in parallel with the apparatus base 3 and along the direction of movement of the disk D.

The intermediate chassis 20 has two through holes 20j provided in two, front and rear, frames 20f and 20r thereof respectively for pivotably accepting the two projections 10p of the traverse base 10. This allows the traverse base 10 to stay sustained in the interior space 20H of the intermediate chassis 20 with its two projections 10p extending across in the corresponding through holes 20j of the intermediate chassis 20. More specifically, the transverse base 10 is arranged so as to be pivotable about the axis Lb, which extends through the two, front and rear, projections 10p, in relation to the intermediate chassis 20 (to the main case 2, in other words).

As described, the intermediate chassis 20, situated between the main case 2 and the traverse base 10, remains supported in the main case 2 while holding the traverse base 10 so that it is pivotable about the axis Lb.

The turn table 11 and the optical pickup 12, which are mounted on the traverse base 10, are positioned so that the center line Lc extending between the two components 11 and 12 extends along the direction of movement of the disk D as being aligned with (or equal to) the axis Lb. Accordingly, when the traverse base 10 is pivoted about the axis Lb (about the center line Lc, in other words), the turn table 11 and the optical pickup 12 turn together about the center line Lc.

The center line Lc between the turn table 11 and the optical pickup 12 and the axis Lb, about which the traverse base 10 is pivoted, extend in parallel with the direction of movement of the disk D or may preferably be equal to the path of movement of the center of the disk D.

As explained above, there is provided the traverse base 10, which carries at least the turn table 11 and the optical pickup 12 and is supported in the main case 2. Accordingly, by pivoting the traverse base 10, both the turn table 11 and the optical pickup 12 are turned simultaneously with ease and certainty.

Also, as the traverse base 10 is turned about the center line Lc which extends across the center of the turn table 11 and the center of the optical pickup 12, its turning movement may never disturb the positional relationship between the center line Lc and the turn table 11 and the optical pickup 12.

In this case, the axis Lb, about which traverse base 10 is turned (and also the center line Lc across the turn table 11 and the optical pickup 12), extends in the direction which coincides with the direction of movement of the disk D. Accordingly, when the traverse base 10 is turned together with the turn table 11 and the optical pickup 12 through 180 degrees about the axis Lb, its turning movement may never affect the positional relation of the turn table 11, the optical pickup 12, and the center line Lc to the direction of movement of the disk D.

Since both the axis Lb of the traverse base 10 and the center line Lc across the turn table 11 and the optical pickup 12 are precisely aligned with the path of movement of the center of the disk D, the turning movement through 180 degrees of the traverse base 10 permits the turn table 11 and the optical pickup 12 to turn through 180 degrees without disturbing the positional relationship between the two components 11 and 12 and the center of the disk D.

The disk tray 31 in the disk drive 1 is arranged for traveling forward and backward with the disk D carried thereon along and between the two, left and right, inner walls 5 of the main case 2 to convey the disk D between the recording/reproducing position P2 (See FIG. 3), which confronts the turn table 11 and the disk loading/unloading position P1 (See FIG. 1) at the outside of the apparatus. Accordingly, the two, left and right, slider plates 26 move outside of the path of movement of the disk D.

A traverse driving motor M3 for driving the turning movement of the traverse base 10 is provided at the rear side in the interior space 20H of the intermediate chassis 20 and at the side of traverse base 10. As the traverse driving motor M3 is mounted by, e.g., a bracket (not shown) on the rear frame 20r of the intermediate chassis 20, its output shaft M3s extends outwardly from the rear frame 20r of the intermediate chassis 20 to the rear side so as to have a motor output gear 61 mounted to the distal end thereof.

Also provided at the rear side of the intermediate chassis 20 are a transfer gear 62 engaged with the motor output gear 61 and a driving gear 63 engaged with the transfer gear 62. The rear projection 10p of the traverse base 10 is integrally joined to the center of the driving gear 63.

Accordingly, when the traverse driving motor M3 is energized, it drives the driving gear 63 via the motor output gear 61 and the transfer gear 62. The movement of the driving gear 63 thus triggers the turning movement about the axis Lb of the traverse base 10 via the rear projection 10p.

A stopper pin 19 is mounted outwardly on the rear side of the traverse base 10. When the traverse base 10 is turned by the action of the traverse driving motor M3 to a position where the turn table 11 and the optical pickup 12 stay facing upward (as shown in FIGS. 1 to 4), the stopper pin 19 comes into direct contact with the upper surface of the rear frame 20r of the intermediate chassis 20 thus restricting further turning movement before the action of the traverse driving motor M3 is canceled. At this time, the traverse base 10 is held in parallel with the intermediate chassis 20 or in its horizontal state.

This allows the turn table 11 and the optical pickup 12 to be turned together to the first position opposite to one side (the lower side in this case) of the disk D.

On the other hand, the rear frame 20r of the intermediate chassis 20 has a concavity or notch 20c provided to a desired depth in the uppermost end thereof at a location which is symmetrical about the axis Lb to the contact location with the stopper pin 19. When the traverse base 10 is turned in a direction opposite to the above described direction by the action of the traverse driving motor M3 to a position where the turn table 11 and the optical pickup 12 stay facing downward, the stopper pin 19 moves into the notch 20c and comes into direct contact with the bottom at the notch 20c of the rear frame 20r thus restricting the further turning movement before the action of the traverse driving motor M3 is canceled. At this time, the traverse base 10 is equally held in parallel with the intermediate chassis 20, that is, in its horizontal state.

This allows the turn table 11 and the optical pickup 12 to be turned together to the second position opposite to the other side (the upper side in this case) of the disk D.

In that manner, the turn table 11 and the optical pickup 12 can be turned together between the first position corresponding to one side (the lower side) of the disk D and the second position corresponding to the other side (the upper side) of the disk D.

The traverse diving motor M3, the motor output gear 61, the transfer gear 62, the driving gear 63, and the rear projection 10p of the traverse base 10 constitute, in a combination, a primary part of "a turning movement mechanism" as defined in the claims of this application.

As described, the turn table 11 and the optical pickup 12 can be moved at once from the first position opposite to one side of the disk D to the second position opposite to the other side of the disk D by a turning movement mechanism, when the recording and/or reproducing action on the other side is to be conducted after the recording and/or reproducing action on the one side of the disk D has been completed. Accordingly, the positional relationship between the turn table 11 and the optical pickup 12 remains unchanged when the side of the disk D to be scanned for the recording and/or reproducing action is alternated from one side to the other side. As a result, the optical axis of the optical pickup 12 can constantly be kept vertical relative to the disk surfaces without disturbing the degree of precision whenever the side of the disk D to be scanned for the recording and/or reproducing action is alternated from one side to the other side.

In the embodiment, the intermediate chassis 20 is provided between the main case 2 and the traverse base 10 as supported by the main case 2 so that the traverse base 10 can be turned in relation to the intermediate chassis 20. This allows the turning movement mechanism to be constructed so that the intermediate chassis 20 and the traverse base 10 are associated with each other. Accordingly, the intermediate chassis 20, the traverse base 10, and the turning movement mechanism can be assembled as one unit thus contributing to improvement in both the simplicity of fabrication and the ease of handling.

As shown in FIGS. 1 to 3, the disk drive 1 of this embodiment has a disk standby position Pm, for holding the disk D at the standby state (See FIG. 2), provided between the recording/reproducing (recording and/or reproducing) position P2 and the disk loading/unloading (loading and/or unloading) position P1. As will be explained later in more detail, in turning the traverse base 10 (with the turn table 11 and the pickup 12) after the disk D has been scanned at one side for the recording and/or reproducing action, the disk D is moved from the recording/reproducing position P2 to the standby position Pm which is located on the way to the loading/unloading position P1, and thus, it is not necessary to pull out the disk D to the loading/unloading position P1. And, the traverse base 10 (with the turn table 11 and the pickup 12) is turned in a state in which the disk D is held in standby mode at the standby position Pm. Thereby, the disk D is transferred without being pulled out to the loading/unloading position P1 at the outside of the disk drive 1, and interruption of the disk D by the turning movement of the traverse base 10 (with the turn table 11 and the pickup 12) can successfully be avoided with ease and certainty.

The recording/reproducing position P2, the standby position Pm, and the loading/unloading position P1 are linearly located in this order from the deepest part of the apparatus (disk drive) 1 along the direction of movement of the disk D.

This allows the width (dimension perpendicular to the direction of movement of the disk D) of the disk drive 1 to remain largely unchanged regardless of the provision of the standby position Pm.

The standby position Pm in this embodiment is situated in the apparatus 1, more specifically in the front part of the internal space of the main case 2 of the apparatus 1.

When the disk D is at the standby position Pm, it can stay substantially (the entire size of the disk D in this embodiment) in the housing of the apparatus 1 with no portion being exposed to the outside. Accordingly, while the disk D is advantageously protected at the standby position Pm, the apparatus 1 itself can remain largely unchanged in appearance during its use.

The tray driving motor M1 and its gear train G1 for movement of the disk tray 31 are provided close to the front end in the main case 2 as best shown in FIG. 1.

Figure 6:
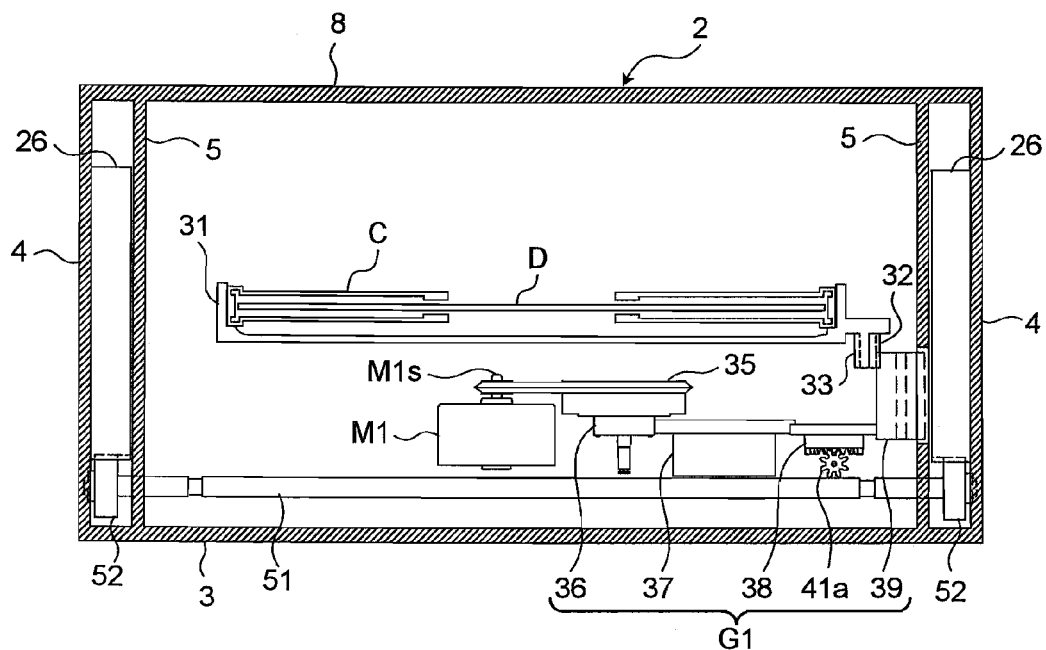
FIG. 6 is a cross sectional view taken along the line Y6-Y6 of FIG. 3, where a tray driving motor and a gear train are illustrated.
Figure 7:
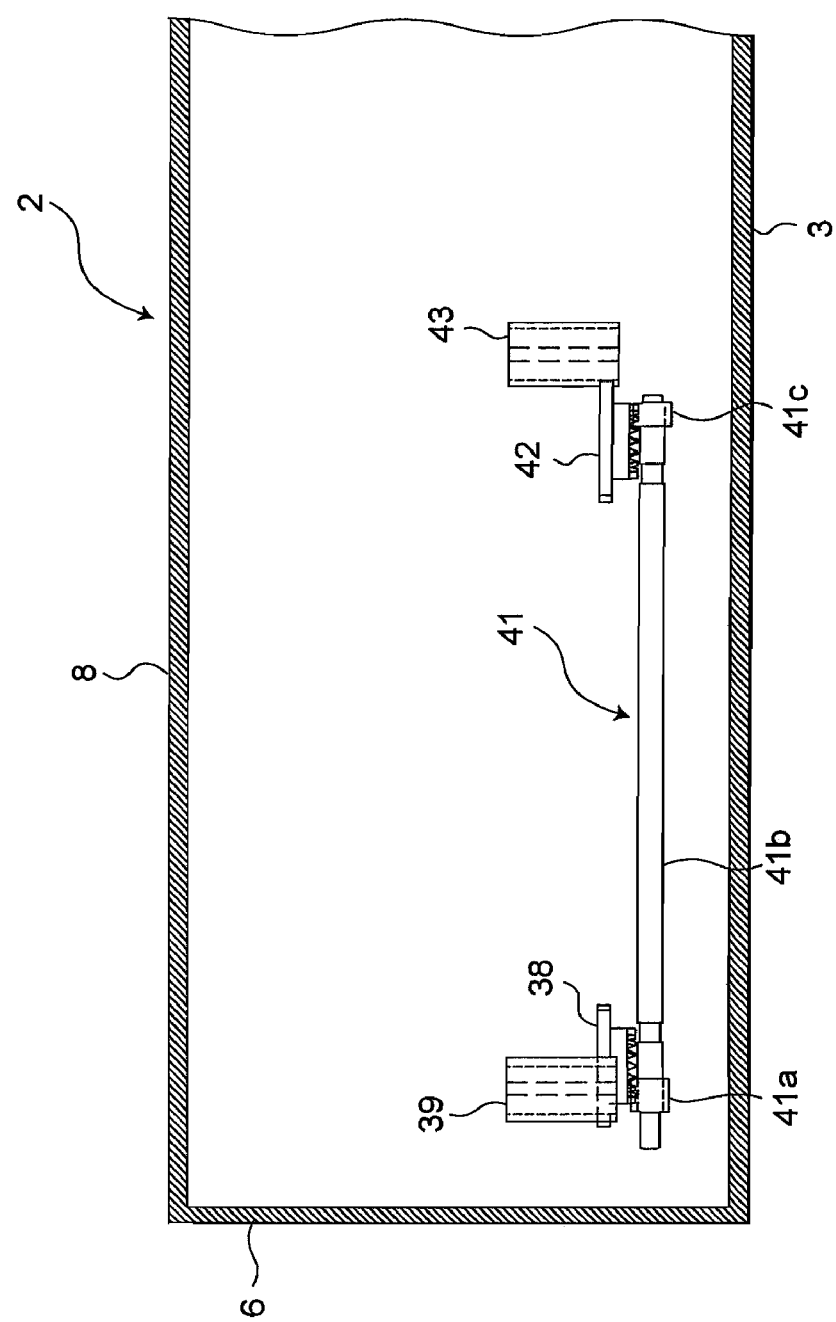
FIG. 7 is a cross sectional view taken along the line Y7-Y7 of FIG. 3, where a timing coupling gear assembly is illustrated.

FIG. 6 is a cross sectional view taken along the line Y6-Y6 of FIG. 3, illustrating an enlargement of the tray driving motor M1 and its gear train G1. FIG. 7 is a cross sectional view taken along the line Y7-Y7 of FIG. 3, illustrating an enlargement of a connection timing gear 41 which extends along the forward and backward directions.

As shown in FIGS. 1, 3, and 6, the gear train G1 includes a pulley gear 36, a transfer gear 37, a coupling gear 38, and an output gear 39 (at the front). Also, a toothed outer rack 32 extending along the forward and backward directions is provided on the lower side at the right end of the disk tray 31. The output gear 39 (at the front) is arranged to engage with the teeth of the outer rack 32.

When the tray driving motor M1 is energized, its power is transmitted from its output shaft M1s via a transmission belt 35 to the pulley gear 36 which then drives the gears 37, 38, and 39 in a row for movement of the tray 31 along the forward and backward directions.

The coupling gear 38 (at the front) in the gear train G1 also drives another coupling gear 42 (at the rear) via a connection timing gear 41 while driving the output gear 39. The rear coupling gear 42 is engaged with an output gear 43 (at the rear) which is paired with the front output gear 39 at the other end.

A toothed inner rack 33 extending in parallel with and inwardly of the outer rack 32 is provided on the lower side at the right end of the disk tray 31. The rear output gear 43 is arranged to engage with the teeth of the inner rack As best shown in FIG. 7, the connection timing gear 41 comprises a power transmitting shaft 41b extending along the forward and backward directions and a driving gear 41a and a driven gear 41c mounted to both, front and rear, ends of the power transmitting shaft 41b, respectively. The driving gear 41a of the connection timing gear 41 is engaged with the front coupling gear 38 while the driven gear 41c is engaged with the rear coupling gear 42.

When the tray driving motor M1 is energized, the driving gear 41a engaged with the front coupling gear 38 in the gear train G1 is driven, and its power is transmitted via the power transmitting shaft 41b to the driven gear 41c which then drives the rear coupling gear 42 and the rear output gear 43 in sequence.

Although not specifically illustrated, the tray driving motor M1, the gear train G1, the connection timing gear 41, the rear coupling gear 42, and the rear output gear 43 are supported by a mounting base anchored to the bottom 3 of the main case 2. Also, the side walls 4 and the inner walls 5 at both, left and right, sides are joined at the top to the ceiling 8 of the main case 2.

As the tray 31 is moved from the loading/unloading position P1 at the outside of the apparatus 1 via the standby position Pm to the recording/reproducing position P2 in the apparatus 1 or vice versa, it travels a long distance. The forward and backward movement of the tray 31 is first conducted by the front output gear 39 of the gear train G1 which engages with the outer rack 32. As the tray 31 is advanced further, its front output gear 39 departs from the outer rack 32 and its rear output gear 43 comes into engagement with the inner rack 33. Then, the tray 31 is succeedingly driven by the rear output gear 43 along the forward and backward directions.

This allows the tray 31 to be moved throughout the long distance with no difficulty. More particularly, the disk D on the tray 31 can be carried from the loading/unloading position P1 via the standby position Pm to the recording/reproducing position P2 or from the recording/reproducing position P2 via the standby position Pm to the loading/unloading position P1 with readiness.

The disk tray 31, the outer rack 32, the inner rack 33, the tray driving motor M1, the gear train G1, the connection timing gear 41, the rear coupling gear 42, and the rear output gear 43 constitute a primary part of "a disk transfer mechanism" defined in the claims of this application.

As shown in FIGS. 1 to 4, the first, second, and third tray detecting sensors S1, S2, and S3 are provided, for example, on the inner surface of the inner wall 5 on the left side. The tray detecting sensors S1, S2, and S3 may preferably be limit switches.

When the disk tray 31 is at the loading/unloading position P1, its presence is detected by only the first detecting sensor S1 switching on. When the disk tray 31 is at the standby position Pm, its presence is detected by the first and second detecting sensors S1 and S2 both switching on. When the disk tray 31 is at the recording/reproducing position P2, its presence is detected by only the third detecting sensor S3 switching on.

The three tray detecting sensors S1, S2, and S3 are electrically connected to a control circuit on the circuit board (not shown) for receiving control signals and delivering detection signals. The control circuit (not shown) is also electrically connected with the tray driving motor M1, the traverse driving motor M3, a slider driving motor M2 which will be explained later, and a spindle motor (not shown) for driving the turn table 11 in addition to the tray detecting sensors S1, S2, and S3 for receiving and delivering signals.

The slider driving motor M2 and its gear train G2 for driving the slider plates 26 are provided substantially at the center along the forward and backward directions in the main case 2 as shown in FIGS. 1 and 4.

Figure 5:
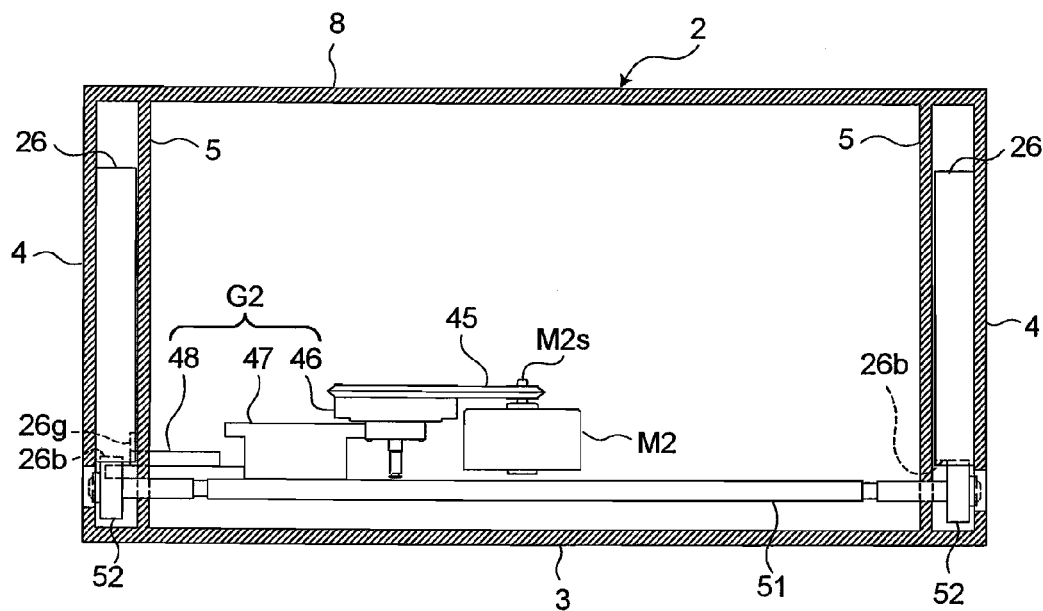
FIG. 5 is a cross sectional view taken along the line Y5-Y5 of FIG. 1, where a slider driving motor and a gear train are illustrated.

FIG. 5 is a cross sectional view taken along the line Y5-Y5 of FIG. 1, which is an enlarged view of the slider driving motor M2 and its gear train G2. As best shown in FIGS. 1, 4, and 5, the gear train G2 includes a pulley gear 46, a transfer gear 47, and an output gear 48.

On the other hand, a toothed side rack 26g extending along the forward and backward directions is provided on the inner side at the lowermost end of the slider plate 26 at the left side. The output gear 48 of the gear train G2 is arranged to engage with the teeth of the side rack 26g.

Also, a slider coupling shaft 51 extending in the widthwise direction of the apparatus 1 is provided at the front side of the slider driving motor M2 and its gear train G2. The slider coupling shaft 51 extends at both ends across the inner walls 5 to beneath the slider plates 26, and left and right coupling gears 52 are mounted on both ends of the slider coupling shaft 51, respectively.

A toothed bottom rack 26b is provided on the lower side of each the slider plate 26 and engaged with the corresponding coupling gear 52.

The slider coupling shaft 51 is rotatably supported at close to the ends by apertures (the bearing portions) of the two, left and right, inner walls 5. Although not illustrated, the slider driving motor M2 and its gear train G2 are supported by a mounting base anchored to the bottom 3 of the main case 2.

When the slider driving motor M2 is energized, its power is transmitted from its output shaft M2s via a transmission belt 45 to the pulley gear 46 which then drives the gears 47 and 48 in a sequence. The output gear 48 drives the left slider plate 26 to move forward or backward through the side rack 26g.

As the left slider plate 26 is driven, its bottom rack 26b rotates the left coupling gear 52 which in turn drives the slider coupling shaft 51 and the right coupling gear 52. Accordingly, the right slider plate 26 with its bottom rack 26b driven by the coupling gear 52 travels forward or backward.

As described, the slider driving motor M2 and its gear train G2, the side rack 26g of the left slider plate 26, the bottom rack 26b of the left and right slider plates 26, the slider coupling shaft 51, and the two coupling gears 52 constitute a slider plate driving mechanism. The slider plate driving mechanism allows the left and right slider plates 26 to move in the forward and backward directions of the apparatus 1 as each is being guided between the side wall 4 and the inner wall 5. The left and right slider plates 26 are substantially identical in the shape while the side rack 26g engaged with the output gear 48 of the gear train G2 is provided only on the left slider plate 26. The two slider plates 26 are thus identical to each other in construction except the side rack 26g.

Figure 8:
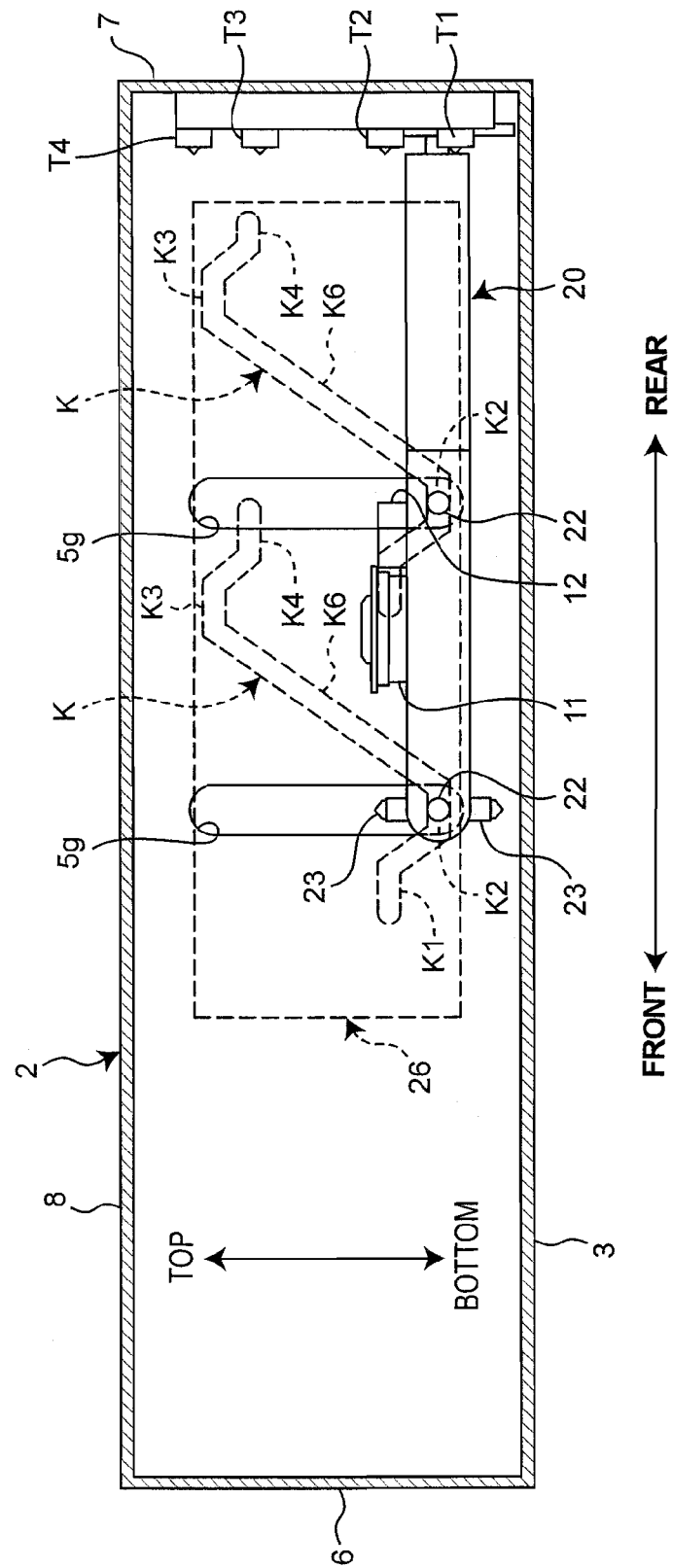
FIG. 8 is a cross sectional view taken along the line Y8-Y8 of FIG. 4, where a slider plate and an intermediate chassis are illustrated.
Figure 9:
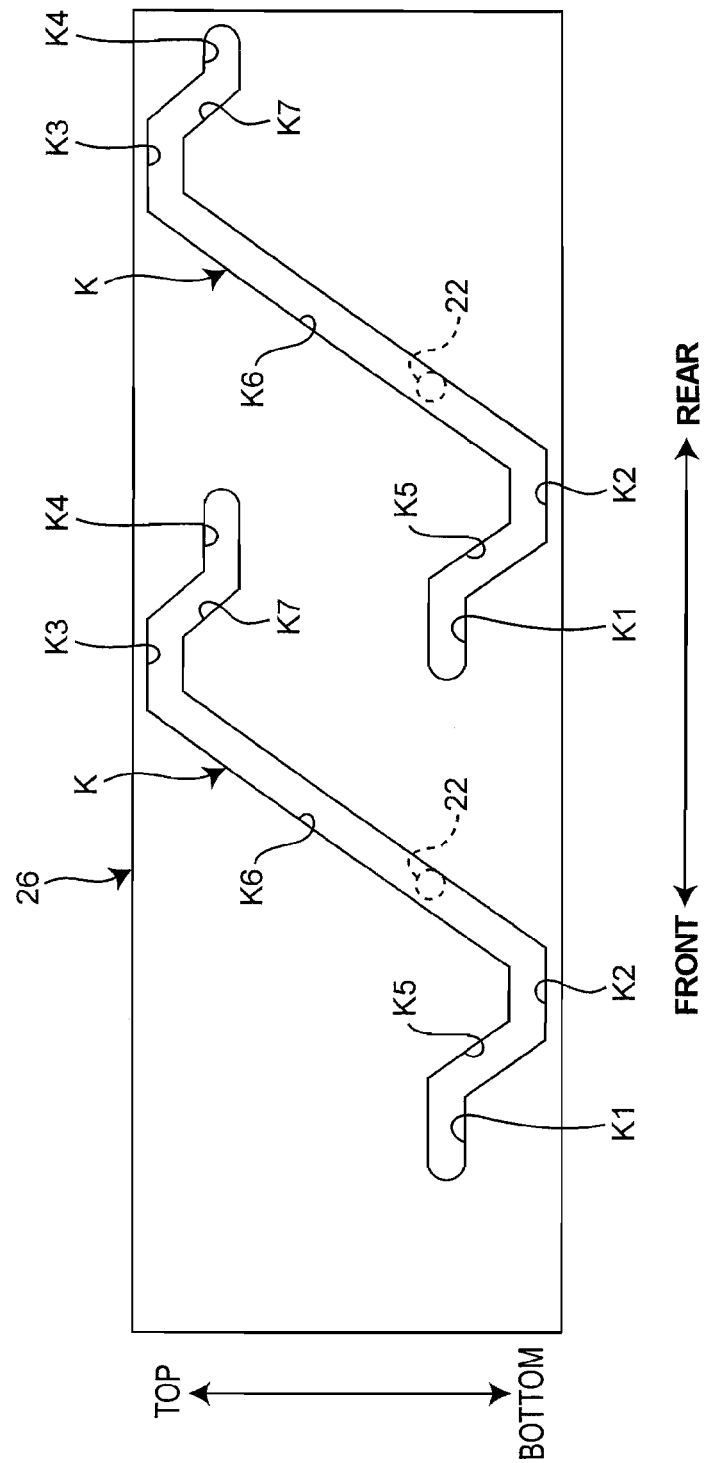
FIG. 9 is an enlarged explanatory view of the slider plate.

FIG. 8 is a cross sectional view taken along the line Y8-Y8 of FIG. 4, illustrating the left slider plate 26 and the intermediate chassis 20. FIG. 9 is an enlarged explanatory view of the slider plate 26.

As illustrated, each of the slider plates 26 has a pair of guide slots K provided in a pattern therein and each of the guide slots K consists mainly of two, upper and lower, horizontal slot regions and a sloping slot region communicating between the two horizontal slot regions. The support pins 22 of the intermediate chassis 20 are inserted into the corresponding guide slots K respectively for engagement. Also, each of the inner walls 5 of the main case 2 has two vertical slots 5g provided therein across which the support pins 22 are extended and received by the corresponding guide slots K.

More specifically as best shown in FIG. 9, the guide slot K includes four, (i.e., first, second, third, and fourth) horizontal slot regions K1 to K4. The horizontal slot regions K1 to K4 extend in the horizontal (along the forward and backward) directions.

The second horizontal slot region K2 is lowest in the height (along the vertical) among the four regions K1 to K4 as it is located close to the bottom of the slider plate 26. The first horizontal slot region K1 is arranged higher by a predetermined distance than the second horizontal slot region K2. Also, the third horizontal slot region K3 is highest as it is located close to the top of the slider plate 26. The fourth horizontal slot region K4 is arranged lower by a predetermined distance than the third horizontal slot region K3.

The rear end of the first horizontal slot region K1 is communicated by a first sloping slot region K5 to the front end of the second horizontal slot region K2. The rear end of the second horizontal slot region K2 is communicated by a second sloping slot region K6 to the front end of the third horizontal slot region K3. Then, the rear end of the third horizontal slot region K3 is communicated by a third sloping slot region K7 to the front end of the fourth horizontal slot region K4.

As the support pins 22 are extended across the vertical slots 5g in the inner walls 5 and received by the corresponding guide slots K (See FIG. 8), they remain not moved in the forward and backward directions but are relatively moved between the first horizontal slot region K1 and the fourth horizontal slot region K4 of the guide slots K when the slider plates 26 travel in the forward and backward directions.

More particularly, the support pins 22 are lifted up and down along the vertical slots 5g as the slider plates 26 travel in the forward and backward directions. This vertical movement allows the intermediate chassis 22 (hence the traverse base 10) to move up and down. As a result, the traverse base 10 is lifted up and down along the axis of rotation of the turn table 11.

For example, when the slider plates 26 are moved forward from the backward position where the support pins 22 remain in the second horizontal slot regions K2 of the guide slots K as shown in FIG. 8, the guide slots K also move forwardly. And, the support pins 22 run along the longest sloping slot regions K6 of the guide slots K and lift up while being guided in the vertical slots 5g of the inner walls 5. At the time when the slider plates 26 are advanced to a given distance, the support pins 22 enter the third horizontal slot regions K3 which are at the highest level, and thereby the intermediate chassis 20 is lifted up by a predetermined amount.

As best shown in FIG. 8, from below, first, second, third, and fourth height detecting sensors T1, T2, T3, and T4 are provided on the inner surface of the rear wall 7 of the main case 2 for detecting the height (in the vertical) of the intermediate chassis 20. The height detecting sensors T1, T2, T3, and T4 may preferably be limit switches.

When the support pins 22 of the intermediate chassis 20 are in the second horizontal slot regions K2 at the lowest portions of the guide slots K, their location is detected by only the first detecting sensor T1 switching on. When the support pins 22 of the intermediate chassis 20 are in the first horizontal slot regions K1 at the second lowest portions of the guide slots K, their location is detected by only the second detecting sensor T2 switching on. When the support pins 22 of the intermediate chassis 20 are in the fourth horizontal slot regions K4 at the second highest portions of the guide slots K, their location is detected by only the third detecting sensor T3 switching on. When the support pins 22 of the intermediate chassis 20 are in the third horizontal slot regions K3 at the highest portions of the guide slots K, their location is detected by only the fourth detecting sensor T4 switching on.

The height detecting sensors T1, T2, T3, and T4 all are electrically connected to the control circuit on the circuit board (not shown) for receiving control signals and delivering detection signals.

While only the left slider plate 26 is illustrated in FIGS. 8 and 9 for ease of the description, the right slider plate 26 also has the guide slots K of the same pattern provided therein.

The guide slots K in the slider plates 26, the vertical slots 5g in the inner walls 5, and the support pins 22 of the intermediate chassis 20 constitute "a component base displacing mechanism" defined in the claims of this application. The displacement mechanism is also driven by the action of the slider plate driving mechanism (including the slider driving motor M2 and its gear train G2, the side rack 26g and bottom rack 26b of the slider plates 26, and the slider coupling shaft 51, and the coupling gears 52).

Accordingly, the traverse base 10 can be turned through 180 degrees between the first position and the second position while having been or being displaced (in the upward direction) along the axis of rotation of the turn table 11 (perpendicular to the disk supporting surface of the turn table 11) by the action of the displacement mechanism.

Particularly, when the traverse base 10 is turned as it is being displaced in the vertical direction, its 180-degree movement can be conducted in a smaller range of the height along the vertical, thus contributing to the down-sizing of the apparatus 1.

The members of the displacement mechanism for displacing the traverse base 10 in the vertical direction, which include the main case 2 and the inner walls 2, are located at the outside of the traveling movement of the disk D. As a result, in moving the disk D, interference between the disk D and the displacement mechanism is surely avoided.

Also, the support pins 22 of the intermediate chassis 20 engage with the guide slots K in the two, left and right, slider plates 26. Thereby, the intermediate chassis 20 is supported by the main case 2. More specifically, the intermediate chassis 20 is supported by the main case 2 at the outside of the traveling movement of the disk D.

Accordingly, the movement of the disk D can be interrupted by no action of the support mechanism of the intermediate chassis 20. Also, the intermediate chassis 20 (and thus the traverse base 10) can be reliably secured at both sides along the widthwise direction in the main case 2.

Moreover, the displacement mechanism for movement of the traverse base 10 in the vertical direction is arranged to displace the traverse base 10 via the intermediate chassis 20. Accordingly, the traverse base 10 can be turned and simultaneously displaced along the axis of rotation of the turn table 11 (in the vertical) by the driving action through the intermediate chassis 20. This allows the apparatus to be simplified in construction and improved in space saving as compared with the provision of two separate mechanisms for turning and displacing the traverse base 10, respectively.

The displacement mechanism for the traverse base 10 is mounted so as to bridge between the main case 2 and the intermediate chassis 20. Accordingly, the intermediate chassis 20 can first be assembled with the traverse base 10 and its turning mechanism to have a single unit and then joined to the main case 2 by the displacement mechanism of the traverse base 10. The assembling process for the two mechanisms will thus be improved in efficiency.

The traverse base 10 is securely mounted by the intermediate chassis 20 to the main case 2. Accordingly, the traverse base 10 can be reduced in the widthwise size as compared with the mounting of the traverse base 10 directly to the main case 2 with no help of the intermediate chassis 20. The turning movement of the traverse base 10 will thus be minimized in radius allowing the apparatus 1 to be limited in height.

The disk drive 1 also includes a clamping mechanism for holding down the disk D on the turn table 11 during the recording and/or reproducing action. Therefore, the clamping mechanism has to turn upside down when the turn table 11 is shifted from the first position to the second position by the 180-degree movement of the traverse base 10. If two clamping mechanisms are provided for this purpose at both the upper and lower sides of the traverse base 10, they will make the overall arrangement intricate and increase the overall dimensions of the disk drive, resulting in significantly increased production costs.

The clamping mechanism in the disk drive 1 will now be described.

Figure 10:
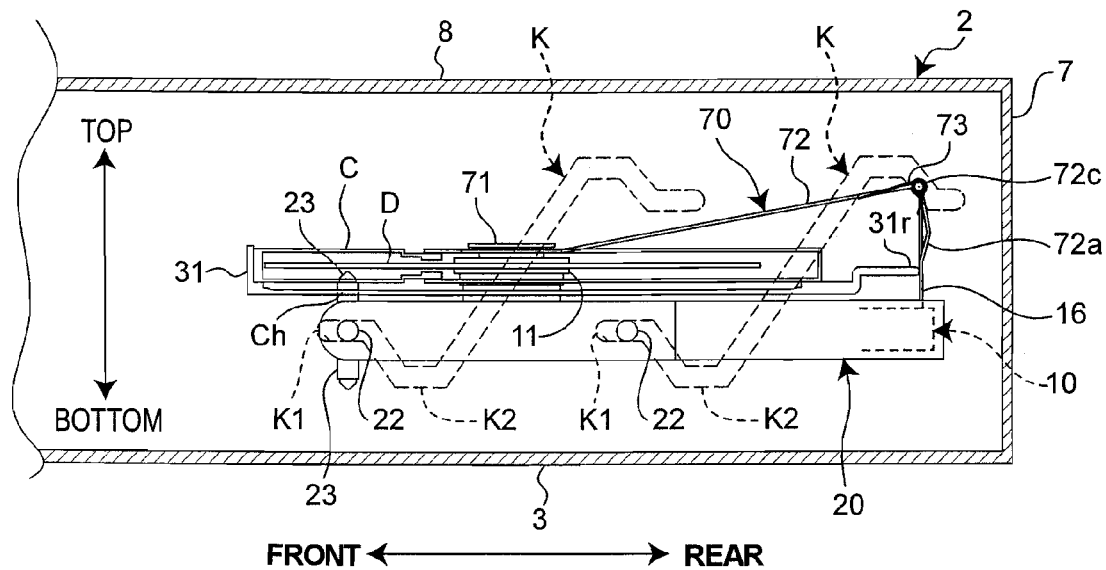
FIG. 10 is an explanatory side view of the intermediate chassis with a turn table and a clamping mechanism in the disk clamping state.
Figure 11:
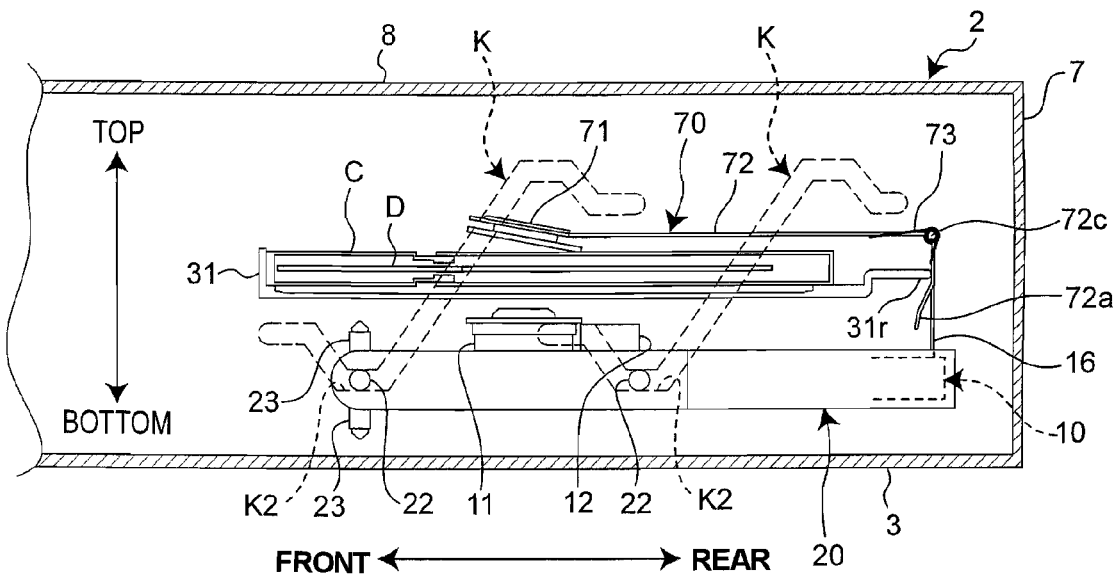
FIG. 11 is an explanatory side view of the intermediate chassis with the turn table and the clamping mechanism in the unclamping state.
Figure 12:
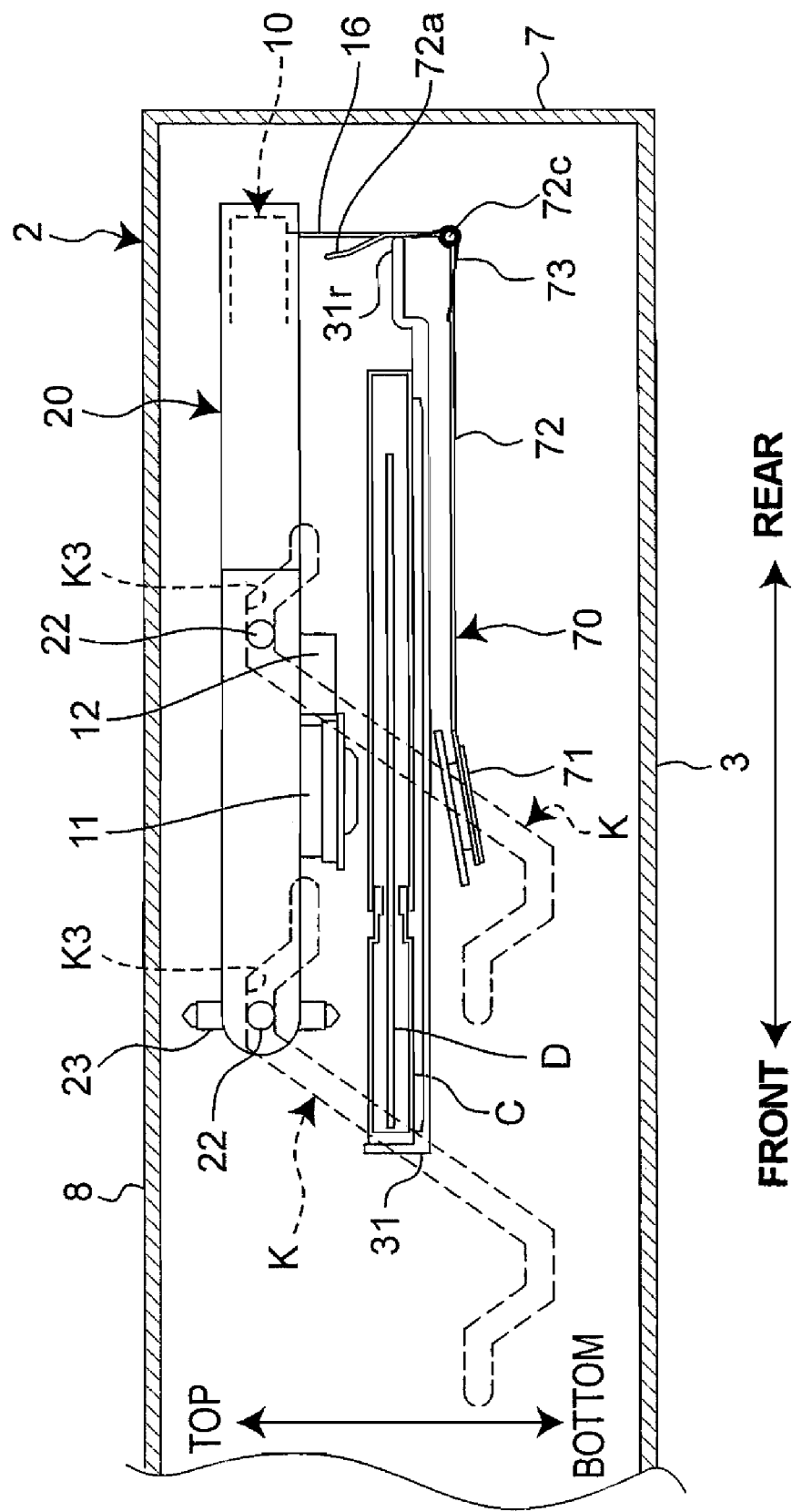
FIG. 12 is an explanatory side view of the intermediate chassis with the turn table and the clamping mechanism turned through 180 degrees.

FIGS. 10, 11, and 12 are explanatory side views showing the intermediate chassis 20, the turn table 11, and the clamping mechanism 70. FIG. 10 illustrates a disk clamped by the clamping mechanism 70. FIG. 11 illustrates no clamping action of the clamping mechanism 70. FIG. 12 illustrates the turn table 11 and the clamping mechanism 70 turned through 180 degrees in the no clamping state shown in FIG. 11.

As shown in those figures, the clamping mechanism 70 includes a clamping strip 72 which has a damper 71 mounted to the distal end thereof as associated with the turn table 11 for clamping the disk D from both sides. The clamping strip 72 is pivotably joined at the proximal corner 72c to the top of a vertical wall 16 provided upright on the traverse base 10 so that it can pivot up and down. The clamping strip 72 may preferably be made of an elastic or spring sheet. Also, a spring 73 is provided on the top of the vertical wall 16 for urging the clamping strip 72 in the unclamping direction.

The arrangement and action of the clamping mechanism 70 is substantially equal to any prior art arrangement. With the disk D clamped between the damper 71 and the turn table 11, the proximal end 72a of the clamping strip 72 remains pressed by the rear end 31r of the disk tray 31 as shown in FIG. 10. This allows the clamping strip 72 to be pivoted down about the proximal corner 72c in the clamping direction (counterclockwisely in FIG. 10) as resisting the urging force of the spring 73. By the spring action of the clamping strip 72, the damper 71 is urged downwardly to press the disk D against the turn table 11.

As described previously, the disk D in this embodiment is of a cartridge type as accommodated in a cartridge C made of plastic. In relation, a pair of left and right positioning pins 23 is provided upright on the front end of the intermediate chassis 20 for positioning the disk D through the cartridge C.

When the clamping mechanism 70 is actuated for the clamping action, the positioning pins 23 fit into their respective positioning apertures Ch provided in the cartridge C to determine the position of the disk D on the intermediate chassis 20.

Using the positioning pins 23 of the intermediate chassis 20 for positioning the disk D through the cartridge C, the position of the disk D on the intermediate chassis 20 (thus in relation to the traverse base 10) can be determined easily and securely with no use of a separate positioning mechanism.

In particular, the positioning pins 23 are mounted on both, upper and lower, sides of the intermediate chassis 20. The positioning pins 23 extend from the first side (for example, the upper side) of the intermediate chassis 20 which confronts the first position of the turn table 11 and from the second side (the lower side) which confronts the second position of the turn table 11.

When the turn table 11 and the optical pickup 12 are situated at either the first or second position, the action of the intermediate chassis 20 can easily and precisely determine the position of the disk D in relation to the traverse base 10 (or the turn table 11) with no use of any separate positioning mechanism.

The positioning pins for positioning the cartridge C (or the disk D) may be provided on the disk tray 31. In this case, the mounting of the positioning pins is only at one side of the tray 31 (where the cartridge C is placed).

As best shown in FIG. 10, in a state that the disk D is clamped, the support pins 22 of the intermediate chassis 20 remain received by the first horizontal slot regions K1 of the guide slots K in the slider plates 26.

As the slider plates 26 travel forward from the above condition by a given distance, the support pins 22 are guided along the first sloping slot regions K5 and moved into the second horizontal slot regions K2 as shown in FIG. 11. Accordingly, the intermediate chassis 20 (or the traverse base 10) moves down. Accordingly, the turn table 11 is separated from the disk D, and the clamping state is canceled as shown in FIG. 11.

Simultaneously, the rear end 31r of the disk tray 31 is disengaged from the proximal end 72a of the clamping strip 72. This allows the clamping strip 72 to be pivoted up about the proximal corner 72c in the unclamping direction (clockwisely in FIG. 11) by the urging force of the spring 73, thereby releasing the clamping of the disk D. Also, the positioning pins 23 depart from their respective positioning apertures Ch in the cartridge C, thus releasing the positioning of the cartridge C (or the disk D). Thereafter, the disk tray 31 is moved from the recording/reproducing position P1, shown in FIGS. 10 and 11, to the standby position Pm.

As the disk tray 31 at the unclamping state shown in FIG. 11 has moved to the standby position Pm, the slider plates 26 are slid forward with the support pins 22 being guided along the second sloping slot regions K6 and running into the third horizontal slot regions K3. Accordingly, the intermediate chassis 20 (or the traverse base 10) is lifted up to the highest level.

As described previously, the movement of the disk tray 31 along the forward and backward directions is sequentially detected by the tray detecting sensors S1, S2, and S3 of which the detection signals are received by the control circuit (not shown) in the apparatus 1. In response to the control signals, the slider driving motor M2 is energized. Accordingly, the sliding movement of the slider plates 26 is triggered at appropriate timing by the movement of the disk tray 31, thereby allowing the intermediate chassis 20 to lift up and down.

Preferably, during the lifting and downward movement of the intermediate chassis 20, the traverse base 10 (carrying the turn table 11 and the optical pickup 12) of the apparatus is turned through 180 degrees in relation to the intermediate chassis 20 in the present embodiment.

As described previously, the movement of the intermediate chassis 20 in the upward and downward directions is sequentially detected by the height detecting sensors T1, T2, T3, and T4 (see FIG. 8) of which the detection signals are received by the control circuit (not shown) in the apparatus 1. In response to the control signals, the traverse driving motor M3 is energized. Accordingly, the turning movement of the traverse base 10 is triggered at appropriate timing by the lifting and downward movement and/or vertical position of the intermediate chassis 20.

It is now assumed that the traverse base 10 is turned during the lifting up of the intermediate chassis 20. In a state in which the support pins 22 of the intermediate chassis 20 are in the second horizontal slot regions K2, which are the lowest portions of the guide slots K in the slider plates 26 (at the unclamping state with only the height detecting sensor T1 switched on) as shown in FIG. 11, the disk tray 31 is moved towards the standby position Pm, and simultaneously the slider plates 26 start to move forward. Thereby, the support pins 22 start to lift up along the second sloping slot regions K6 (with the height detecting sensor T1 switched off). When the support pins 22 arrive at the height level corresponding to the first horizontal slot regions K1, the height detecting sensor T2 is switched on. In response to the detection signal of the sensor T2, the traverse driving motor M3 starts its rotating action in order to turn the traverse base 10.

As the traverse base 10 is turned, according to the turning direction, the stopper pin 19 fixed at the rear end of the traverse base 10 comes into direct contact with the top of the rear frame 20r of the intermediate chassis 20, or fits into the notch 20c having the predetermined depth and being provided in the rear frame 20r of the same and comes into direct contact with the bottom of the notch 20c. Thereby, further turning of the traverse base 10 is regulated, and at the timing of termination of the turning movement of the traverse base 10, the traverse driving motor M3 is deenergized. As a result, the traverse base 10 is successfully turned upside down or through 180 degrees in relation to the intermediate chassis 20 (see FIG. 12).

The turning movement of the traverse base 10 is timed with the lifting up of the intermediate chassis 20. Accordingly, the turning movement of the traverse base 10 is controlled by the vertical stroke of the lifting movement of the intermediate chassis 20. Since both movements for lifting up/lowering down the intermediate chassis 20 and turning the traverse base 10 are conducted simultaneously, the overall size, and particularly the height, of the apparatus 1 can be minimized.

Although the traverse base 10 is turned during the lifting up or down of the intermediate chassis 20 in the foregoing description, it may be turned at either the uppermost or lowermost position. In the latter case, the height of the apparatus 1 will commonly be greater than that of the traverse base 10 turned during the lifting up or down of the intermediate chassis 20.

In a case that the traverse base 10 is turned at the uppermost position of the intermediate chassis 20, the support pins 22 of the intermediate chassis 20 are lifted up along the second sloping slot regions K6 of the guide slot K in the slider plates 26 and upon reaching the third horizontal slot regions K3 at the highest level, the detection sensor T3 is switched on. In response to the detection signal from the sensor T3, the traverse driving motor M3 starts its rotation to turn the traverse base 10 through 180 degrees.

Thereafter, when the traverse base 10 is turned upside down again through 180 degrees, the movement may be conducted at this uppermost position. In this case, a space sufficient to rotate the traverse base 10 is required above the uppermost position of the intermediate chassis 20.

The 180-degree turning or upside down movement of the traverse base 10 may be conducted when the intermediate chassis 20 is at the lowermost position (in the second horizontal slot regions K2 at the lowest level).

The clamping mechanism 70 is integrally engaged with the vertical wall 16 anchored to the traverse base 10 and can thus be simultaneously moved upside down when the traverse base 10 is turned through 180 degrees as shown in FIG. 12.

Since the clamping mechanism 70 is turned together with the turn table 11 and the optical pickup 12, its position relative to the turn table 11 remains unchanged with the positional relationship between the turn table 11 and the pickup 12 staying unchanged when the side the disk D to be scanned for the recording and/or reproducing action is alternated from one side to the other. Accordingly, the optical axis of the pickup 12 can precisely be held vertical relative to the disk D which remains securely pressed down against the turn table 11 by the action of the clamping mechanism 70. More particularly, the optical axis of the optical pickup 12 can effectively be prevented from deflecting from the precise vertical to the surface of the disk D to be scanned for the recording and/or reproducing action whenever the side of the disk D to be scanned for the recording and/or reproducing action is alternated from one side to the other.

The action of the disk drive 1 having the foregoing arrangement will be described in brief.

For loading the disk D onto the disk tray 31, the tray driving motor M1 is actuated by a user switching a start switch on the operation panel (not shown) of the apparatus 1. The disk tray 31 is hence moved forward to the loading/unloading position P1 (until the tray detecting sensor S1 is turned on; see FIG. 1) and the disk cassette C is loaded on the disk tray 31 at this position P1. When the motor M1 is then actuated by the user, the disk tray 31 moves backward to the recording/reproducing position P2 (until the tray detecting sensors S2 and S3 are switched on; see FIG. 3). By now, the clamping mechanism 70 remains at its unclamping state (see FIG. 11).

As the disk tray 31 has been moved to the recording/reproducing position P2, the slider driving motor M2 starts its rotation to displace the intermediate chassis 20 along the axis of rotation of the turn table 11. This causes the clamping mechanism 70 to shift to the clamping state for holding the disk D on the turn table 11.

The disk D is then scanned at one side for the recording or reproducing action at the position P2. At this time, the turn table 11 and the optical pickup 12 are located so as to face the one side of the disk D (at the first position; see FIG. 10).

When an operation mode switch (not shown) in the disk drive 1 is set to the double-side operation mode for recording and/or reproducing signals on both sides of the disk D, the slider driving motor M2 starts its action to release the clamping state after the end of the recording or reproducing action at one side of the disk D. Then, the tray driving motor M1 is actuated to move the disk tray 31 with the disk D carried on to the standby position Pm (until the tray detecting sensors S1 and S2 are switched on; see FIG. 2).

As the slider plates 26 are moved by the rotation of the slider driving motor M2, they displace (lift up, in this case) the intermediate chassis 20. With the intermediate chassis 20 being displaced or having been displaced, the traverse driving motor M3 is actuated to turn the traverse base 10 through 180 degrees from the first position to the second position.

As a result, the turn table 11 and the optical pickup 12 come to face the other side of the disk D (at the second position; see FIG. 12).

Then, the tray driving motor M1 is actuated to move the disk tray 31 from the standby position Pm to the recording/reproducing position P2 (until the tray detecting sensors S2 and S3 are switched on; see FIG. 3). And, by actuating the slider driving motor M2, the disk D is again clamped onto the turn table 11. The other side of the disk D is then scanned for the recording or reproducing action.

In this manner, the disk D can be scanned on both sides automatically and continuously for the recording or reproducing action.

When the operation mode switch (not shown) in the disk drive 1 is not set to the double-side operation mode but a reverse operation switch (not shown) for scanning the other side of the disk D than the side currently at the scanning mode is switched on, the disk D the reverse side can be scanned for recording and/or reproducing action, without being pulled out from the apparatus 1.

In the latter case, the switching on of the reverse operation switch for the recording or reproducing action can energize the slider driving motor M2 to release the clamping of the disk D. Then, the tray driving motor M1 is actuated, and the disk tray 31, with the disk D carried thereon, is moved to the standby position Pm (until the tray detecting sensors S1 and S2 are switched on; see FIG. 2).

And, by driving of the slider plates 26, the traverse base 10 is turned through 180 degrees from the first position to the second position, with the intermediate chassis 20 being displaced or having been displaced upwardly.

Accordingly, the turn table 11 and the optical pickup 12 can come to face the other side of the disk D (at the second position; see FIG. 12).

Then, the disk tray 31 is moved from the standby position Pm to the recording/reproducing position P2 (until the tray detecting sensors S2 and S3 are switch on; see FIG. 3). Also, the disk D is clamped again on the turn table 11. The recording or reproducing action on the other side of the disk D then follows.

As described, the control circuit (not shown) in the disk drive 1 receives the input signals from the switches on the operation panel and the detection signals from the tray detecting sensors S1 to S3 and the height detecting sensors T1 to T4 for the intermediate chassis 20. The control circuit is also electrically connected with the tray driving motor M1, the slider driving motor M2, the traverse driving motor M3, and the spindle motor (not shown) for rotating the turn table 11 for exchanging the relevant signals. The control circuit can thus be responsive to the detection signals from the sensors and the motor rotation signals from the motors for controlling appropriately the forward and backward movement of the disk tray 31, the sliding movement of the slider plates 26 along the forward and backward directions, the turning movement of the traverse base 10, and the rotating movement of the turn table 11, respectively.

While the embodiment is described in the form of a horizontal type disk drive 1, it is not limited to the horizontal type but may be applied with equal success to any other type such as a vertical type.

It would hence be understood that the present invention is not limited to the above described embodiment and various changes and modifications are possible without departing from the scope of the present invention.

What is claimed is:

1. A disk drive comprising:
   a main case;
   an intermediate chassis supported by the main case;
   a turn table for rotatably supporting a disk thereon:
   a pickup for recording and/or reproducing data signals on the disk rotatably supported on the turn table; and
   a disk transfer mechanism for transferring the disk bidirectionally between a recording and reproducing position, which confronts the turn table, and a disk loading and unloading position at the outside of the disk drive;
   a turning movement mechanism for turning the turn table and the pickup at once from a first position, which confronts one side of the disk, to a second position, which confronts the other side of the disk or vice versa; and
   a component base on which at least the turn table and the pickup are mounted, the component base being supported by the main case for turning about a center line that extends through a center of the turn table and a center of the pickup,
   wherein the turning movement mechanism is arranged to turn the component base about the center line so that the turn table and the pickup can be turned between the first position and the second position,
   wherein the intermediate chassis is disposed between the main case and the component base while the turning movement mechanism is arranged for turning the component base in relation to the intermediate chassis.

2. A disk drive according to claim 1, wherein a standby position for the disk is provided between the recording and reproducing position and the loading and unloading position, and the three positions are aligned in a row along the direction of transfer movement of the disk as ordered from the recording and reproducing position to the standby position and the loading and unloading position.

3. A disk drive according to claim 2, wherein the standby position is located in the disk drive.

4. A disk drive according to claim 1, wherein the center line is extended in the same direction as of the transfer movement of the disk.

5. A disk drive according to claim 1, further comprising a component base displacing mechanism for displacing the component base along the axis of rotation of the turn table.

6. A disk drive according to claim 5, wherein the component base displacing mechanism is located outside of the path of the transfer movement of the disk.

7. A disk drive according to claim 5, wherein the components base displacing mechanism is arranged for displacing the component base via the intermediate chassis.

8. A disk drive according to claim 1, wherein the intermediate chassis is supported at both sides by the main case at a location outside of the path of the transfer movement of the disk in the main case.

9. A disk drive according to claim 1, wherein the disk is of a cartridge type and the intermediate chassis includes a positioning means for positioning the disk via its cartridge.

10. A disk drive according to claim 9, wherein the intermediate chassis has a first side confronting the first position and a second side confronting the second position, and the two positioning means are mounted on the first and second sides of the intermediate chassis, respectively.

11. A disk drive according to claim 1, further comprising a clamping mechanism for pressing down the disk on and against the turn table, the clamping mechanism is arranged so as to be turnable together with the turn table and the pickup.

* * * * *